US010648520B2

(12) United States Patent
Boland et al.

(10) Patent No.: US 10,648,520 B2
(45) Date of Patent: May 12, 2020

(54) RAPID ONSET OVERLOAD PREDICTION AND PROTECTION

(71) Applicant: WPT Power Corporation, Wichita Falls, TX (US)

(72) Inventors: John G. Boland, Wichita Falls, TX (US); Fredric A. Bland, Lake Isabella, MI (US)

(73) Assignee: WPT Power Corporation, Wichita Falls, TX (US)

( * ) Notice: Subject to any disclaimer, the term of this patent is extended or adjusted under 35 U.S.C. 154(b) by 85 days.

(21) Appl. No.: 16/097,192

(22) PCT Filed: Apr. 26, 2016

(86) PCT No.: PCT/US2016/029320
§ 371 (c)(1),
(2) Date: Oct. 26, 2018

(87) PCT Pub. No.: WO2017/188932
PCT Pub. Date: Nov. 2, 2017

(65) Prior Publication Data
US 2019/0136919 A1    May 9, 2019

(51) Int. Cl.
*F16D 48/06*    (2006.01)

(52) U.S. Cl.
CPC .......... *F16D 48/066* (2013.01); *F16D 48/06* (2013.01); *F16D 2500/1045* (2013.01); *F16D 2500/10437* (2013.01); *F16D 2500/10481* (2013.01); *F16D 2500/1112* (2013.01); *F16D 2500/3027* (2013.01); *F16D 2500/3067* (2013.01); *F16D 2500/3068* (2013.01); *F16D 2500/30406* (2013.01); *F16D 2500/30412* (2013.01);

(Continued)

(58) Field of Classification Search
CPC ..................... F16D 48/06; F16D 48/10; F16D 2500/10437; F16D 2500/5048; F16D 2500/5102; F16D 2500/5104; F16D 2500/5114
See application file for complete search history.

(56) References Cited

U.S. PATENT DOCUMENTS 5,360,381 A    11/1994  Swist
6,557,687 B1    5/2003  Herchick
(Continued)

FOREIGN PATENT DOCUMENTS

FR    2967959    *    6/2012

OTHER PUBLICATIONS

International Search Report and Written Opinion, PCT/US2016/029320, dated Dec. 14, 2016, 15 pages.

*Primary Examiner* — Erin D Bishop
(74) *Attorney, Agent, or Firm* — Booth Albanesi Schroeder PLLC; Peter V. Schroeder (57) ABSTRACT

A clutch controller provides protective disengagement of a clutch between an engine and driven machinery to prevent engine failure due to rapid onset overload. Sensor signals of measured parameters are used by the controller to determine potential engine failure. Multiple, successive sensor signals and elapsed times are assessed during which the current sensor signal value and the scaled rate of change in signal values is compared against a predefined amount. The clutch controller sends a clutch disengagement signal if a calculation result is indicative of imminent failure.

30 Claims, 6 Drawing Sheets

(52) U.S. Cl.
CPC .............. *F16D 2500/30415* (2013.01); *F16D 2500/30421* (2013.01); *F16D 2500/30426* (2013.01); *F16D 2500/30816* (2013.01); *F16D 2500/30818* (2013.01); *F16D 2500/5048* (2013.01); *F16D 2500/5102* (2013.01); *F16D 2500/5104* (2013.01); *F16D 2500/5114* (2013.01); *F16D 2500/7041* (2013.01); *F16D 2500/70406* (2013.01); *F16D 2500/70424* (2013.01); *F16D 2500/70673* (2013.01)

(56) References Cited

U.S. PATENT DOCUMENTS

| | | |
|---|---|---|
| 8,066,619 B2 | 11/2011 | Herchick et al. |
| 8,577,559 B2 | 11/2013 | Hel et al. |
| 2006/0116236 A1* | 6/2006 | Trush .................... F16H 61/143 477/62 |
| 2014/0249728 A1 | 9/2014 | Schaffner et al. |

* cited by examiner

RAPID ONSET OVERLOAD PREDICTION AND PROTECTION

FIELD

The embodiments of the present disclosure relate generally to power transmission control, and more specifically to a system for detecting and protecting against rapid onset machine overload through power transmission control.

BACKGROUND

Machinery is often driven using a prime mover which produces rotary motion, such as an engine, motor, turbine, etc. A selectively engageable coupling assembly, such as a clutch or transmission is positioned between the prime mover and the driven machinery. In a common arrangement, some type of clutch, power take-off, or the like is used to selectively and controllably transfer rotary motion of a drive shaft to an input shaft of the driven machinery. Preferably engagement, disengagement, and load variation across the clutch are smooth and predictable.

Problems arise, however, where the machinery is subject to jams and other rapidly occurring overload events. In such cases, it is desirable to disengage the engine from the driven machinery to avoid damage to the driving engine, the driven machinery, or coupling assembly.

BRIEF DESCRIPTION OF THE DRAWINGS

Drawings of the preferred embodiments of the present disclosure are attached hereto so that the embodiments of the present disclosure may be better and more fully understood.

DETAILED DESCRIPTION OF SOME EMBODIMENTS

Some machinery, such as rock crushers, grinders and shredders, wood chippers, material handlers, etc., experiences routine torque overloads due to jams, shocks, and the like. Such overload events can severely damage the driven machinery, the engine, and the clutch assembly. Consequently, various automatic clutch releases, some with automatic reset, have been developed which disengage the clutch elements upon overload. These clutch releases depend on a mechanical reaction (e.g., pin shear, cam movement, etc.) which automatically occurs in response to application of a pre-selected load, force, shear, etc.

Automatic resetting friction clutches are designed to slip at a preset overload torque value. The clutch reengages when the overload is removed. Torque limiting friction clutches are useful where partial power transmission and slippage will not damage the machinery or engine.

A ball-detent reset torque limiter engages clutch elements using balls seated in detents on the shaft, clutch disc, or the like, and are biased into engagement with springs. A torque overload causes the balls to retract from their detents, thereby disengaging the clutch. Ball-detent torque limiters can have multiple detent positions and can automatically or manually reset. An automatic resetting torque limiter reengages when the torque demand falls below the release torque. Alternatives to spring biased balls can include biased cam-followers or spring-biased pins which reciprocate in cylindrical seats.

In automatic torque limiters with cam-operated disengagement, a series of pins are movable along radially extending cylinders defined in the drive element. When engaged, the pinheads extend into recesses in the driven element. Each pin has a contoured base which engages between two spring-biased cams having contoured cam profiles. Automatic disengagement occurs when radial force on the pins due to rotation exceeds the force applied by the contoured profiles of the spring-biased cams. When the contoured base of the pin is forced between the cams, the system is disengaged. The pins reengage their seats in the driven body upon a reduction in speed.

Replaceable shear pins or resettable pins can be used to shear or release at a selected overload torque value. Shear pins must be replaced after shearing due to overloading. Resettable pins and the like are "tripped" on occurrence of overload torque and can be reset automatically or manually to reengage the clutch.

Alternately, overload protection systems can rely on active disengagement of the clutch elements triggered by the occurrence of selected, measured parameters. For example, sensor measurements of rotational speeds of shafts upstream and downstream from the clutch assembly can be compared to indicate slippage. Alternately, angular displacement between upstream and downstream elements can be measured, with clutch release occurring upon occurrence of a pre-set displacement measurement. Such systems rely on measurable or calculable parameters (e.g., rotational shaft speeds, relative angular position, etc.) and on unknown variables, such as the coefficient of friction between clutch elements, etc.

Alternately, thermal methods relying on the heat developed during slipping and resulting temperature rise of the clutch pack or, if a wet clutch pack, the temperature rise of the hydraulic fluid as it flows through the clutch, may be employed. The equivalence of these methods is due to the mechanical relationship between power and slipping speed and slipping torque.

Figure 1:
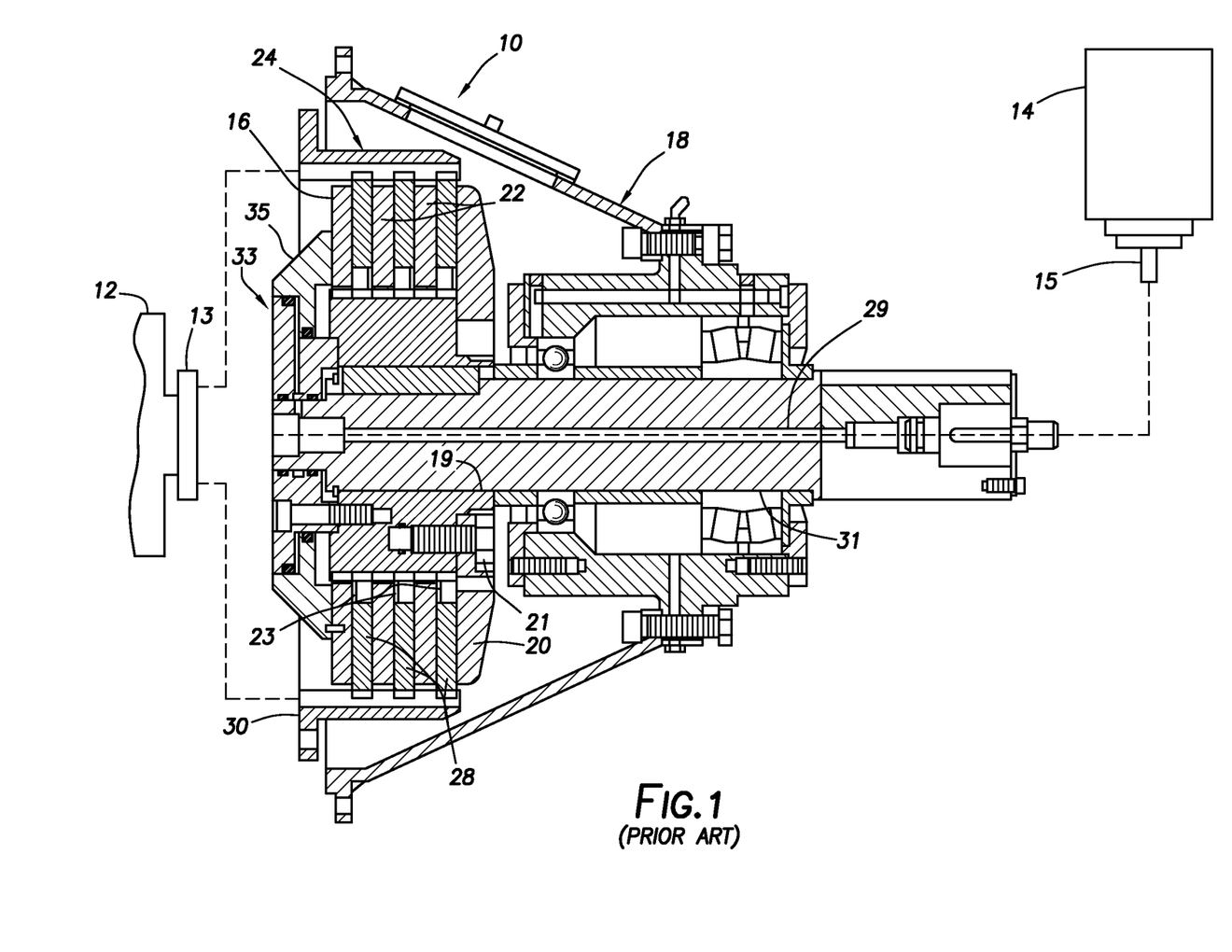
FIG. 1 is a schematic of an exemplary engine, transmission, and driven machine having an associated Rapid Onset Overload detection and protection system according to aspects of the invention.

FIG. 1 is a schematic of an exemplary coupling assembly 10 positioned between an engine 12 and a driven machine 14 according to aspects of the disclosure. Elements are not to scale and the clutch assembly is representative and not limiting.

The clutch assembly seen in FIG. 1 is an example of a dry friction plate clutch assembly for discussion. The disclosed features herein are not limited to such clutch assemblies. The coupling assembly 10 can be a clutch, transmission, Power Take-Off (PTO), or the like. As used herein, the term "clutch," "clutch assembly," "coupling assembly," and the like are used generically or in reference to Figures of exemplary embodiments and are not limiting. Those of skill in the art will recognize application and analogous uses in other coupling assembly types.

The friction clutch assembly 10 is used to selectively transmit rotary motion of a drive shaft 13 of an engine 12 to a driven shaft 15 of a driven machine 14. Clutches move between engagement, wherein the drive and driven shafts rotate at the same speed, and disengagement, wherein the driven shaft is free of the drive shaft. Typically, partial engagement is also possible such that the drive and driven elements of the clutch "slip" with respect to one another; that is, the drive element transmits torque to the driven element but the elements rotate at different speeds. The selectively engageable clutch elements are often friction, toothed, contoured, or other mating discs.

The conventional friction clutch assembly 10 is mounted within a housing 18. A thrust or pressure plate 16 is mounted for selective axial movement along a hub 19. A backplate 20 is at the opposing end of the clutch assembly and attached to the hub 19 at fasteners 21. Additional center or floating plates 22 are movably attached to the hub, such as by axial splines.

A friction disc assembly 24 interleaves friction discs 28 between adjacent plates 16, 20, and 22, as shown. The friction discs 28 often include wear and heat resistant friction facings. The friction discs 28 are axially splined to a cooperatively splined drive ring 30. The drive ring is attached to the drive shaft 13 (or flywheel, etc.), to be driven by the engine 12.

The engine 12 may take the form of an internal combustion engine, an electric motor, etc. "Engine" is used generically herein to indicate any rotary prime mover and includes without limitation motors, engines, and turbines. The engine outputs power as torque via a rotary element such as a drive shaft, drive collar, rotary housing or the like. "Drive shaft" is used generically herein to indicate such an element. Persons of skill in the art will recognize other types of rotary prime movers and torque transferring elements.

The pressure plate 16 is biased away from the backplate 20 by biasing elements 23 such as Belleville springs, diaphragms, coil springs, etc., such that the clutch is disengaged in its default position. In alternate embodiments, the biasing can be reversed such that the coupling assembly defaults to an engaged position. Multiple biasing mechanisms can be employed at various positions in the assembly. For example, biasing mechanisms can maintain proper spacing between adjacent plates and discs until activation of the clutch.

In use, the clutch assembly is movable between an engaged position, wherein the drive shaft 13 and driven shaft 15 are coupled, and a disengaged position, wherein the driven shaft 15 is free of the drive shaft 13. In the engaged position, the pressure plate 16 is forced axially towards the backplate 20 by an actuator assembly. Axial motion of the pressure plate 16 causes axial movement of floating plates 22 and friction discs 28 along their axial splines. The plates and friction discs are "sandwiched" together, that is, moved into engaging contact such that torque is transmitted from the drive shaft 13 and drive ring 30, via the friction discs 28, to the plates 16, 20 and 22, hub 19, output shaft 31, and driven shaft 15.

Partial engagement is possible such that the drive and driven elements of the clutch "slip" with respect to one another; that is, the drive elements transmit torque to the driven elements but the elements rotate at different speeds.

The pressure plate, in the illustrated embodiment, is biased towards a disengaged position by biasing members 23. Biasing force is overcome and the clutch moved to an engaged position by an actuator 33. In an exemplary embodiment, a hydraulic line 29 runs axially through the output shaft 31 and selectively applies hydraulic pressure to interior chambers defined within the actuator 33 causing a piston 35 or the like to overcome the biasing force and move the pressure plate into engagement with the friction disc assembly.

The actuator 33 controls engagement and disengagement of the clutch and can be mechanical, electro-mechanical, hydraulic, etc. Supply of actuating force can be by linkage, wire, hydraulic lines, etc., extending through apertures in the housing, bearing or pressure plates, along a channel defined in the shaft, etc.

Figure 2:
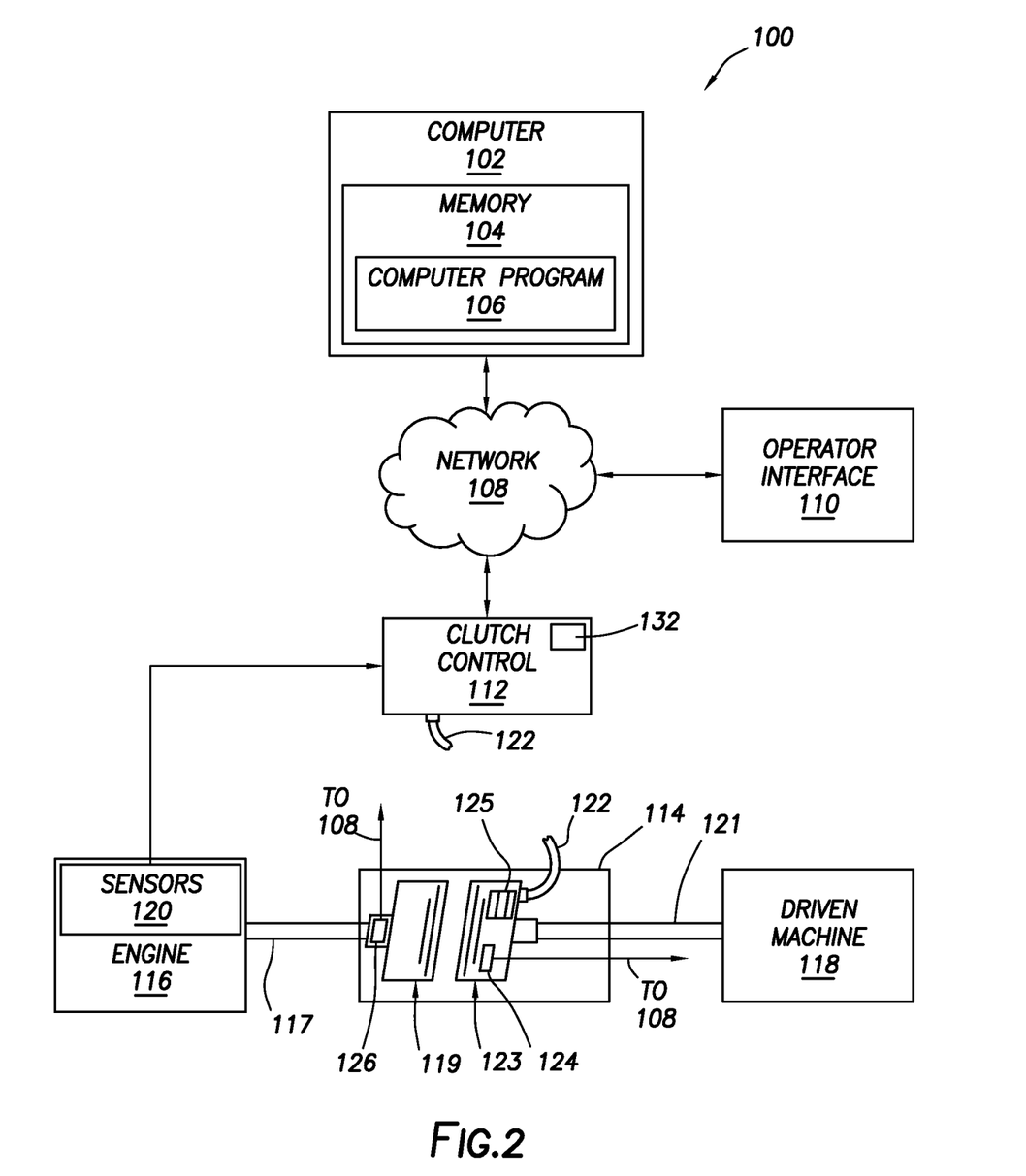
FIG. 2 is a schematic of an exemplary engine and machine selectively coupled by a clutch and operable by an associated Rapid Onset Overload protection and detection computer program according to aspects of the disclosure.

FIG. 2 is a schematic of an exemplary engine and machine selectively coupled by a clutch and operable by an associated Rapid Onset Overload protection and detection computer program according to aspects of the disclosure.

A computerized system 100 includes a computer 102, a memory 104, a computer program 106, a network 108, an operator interface 110, and a clutch control system 112. The computer program 106 is stored in the memory 104 and executed by the computer 102 to communicate with the operator interface 110 and the clutch control system 112 via the network 108.

While these elements are configured for clarity in the FIG. 2, it is expected that persons of skill in the art will recognize that the elements can be arranged differently with respect to one another and the network. For example, the memory 104 can include remote databases, themselves accessed via network. As another example, the interface 110 can physically be located at any position useful to the operator, such as at or near the clutch controller 112, at the driven machinery 118, etc. Further the network 108 is exemplarily positioned between the clutch controller 112 and the computer, memory, program blocks. In fact, the network 108, which can include various and numerous elements such as cables, wireless transmitters and receivers, routers, gateways, servers, computers, mobile devices, busses, CANbusses, firewalls, etc., can be used to connect the program 106, memory 104, interface 110, clutch controller 112, engine sensors and controllers, driven machinery sensors and controllers, etc., in various relative positions. In fact, all or part of the computer, memory, and program can be considered as portions of the clutch controller 112 and may reside at or near the controller or a pre-existing controller interface. Additional elements can be employed as well. For example, the engine 116 typically includes an engine controller having its own software programs, sensors, computer system, controllers, etc. A remote start control feature is discussed herein as an example. Similarly, the driven machinery in many cases will have its own computer control system.

The engine 116 provides rotary motion and torque via the drive shaft 117 to which a drive portion 119 of a clutch assembly 114 is mounted. The drive portion 119 of the clutch assembly 114 for the exemplary friction clutch of FIG. 1 includes the backplate 20 fixedly mounted to the drive shaft 13.

Similarly, the driven machine 118 includes a driven shaft 121 attached to a driven portion 123 of the clutch assembly 114. The driven portion of the clutch assembly can include, as in the exemplary friction clutch described with respect to FIG. 1, a housing 18 in which is mounted a biased and axially slidable pressure plate 16 movable between engaged and disengaged positions.

The driven portion 123 of the clutch assembly includes an actuator 125 and typically a biasing member. The actuator 125 is typically positioned within the clutch housing and selectively moves a pressure plate or other movable actuator member of the clutch to an engaged or disengaged position, typically overcoming a biasing force which acts to reset the clutch to its initial position. The actuator 125 can be a hydraulic-powered actuator selectively supplied with pressurized fluid to selectively move a piston (or similar) housed in the clutch assembly. Other actuators such as pneumatic actuators, linear actuators, radial actuators, electromechanical actuators, etc., are known in the art. The drive portion and driven portion of the clutch assembly can include friction discs, intervening plates, biasing assemblies, etc., as known in the art.

The clutch control system 112 controls operation of the clutch assembly 114 and transmits clutch control signals to operate the actuator 125. The signals can be hydraulic pressure signals created by an attached fluid pump (not shown) and transmitted along hydraulic lines 122, or electrical signals transmitted along wire lines (or wirelessly), etc., as is known in the art. The control signals include engagement signals and disengagement signals, which may take the form of signals to increase/decrease pressure, open/close a switch, etc.

In the exemplary hydraulic-actuated clutch assembly, in which the plates and discs are biased towards a disengaged position, an engagement signal comprises an increase in hydraulic pressure through line 122 which moves the hydraulic actuator 125 (e.g., piston) housed in the clutch assembly, thereby axially moving the pressure plate (or similar) to engage the drive and driven portions of the clutch. Axial movement of the pressure plate causes engagement of the discs and plates, thereby transmitting torque from the rotating drive shaft 117 and drive portion 119 of the clutch to the driven portion 123 of the clutch and the driven shaft 121. Similarly, a disengagement signal can comprise a reduction in hydraulic pressure such that a biasing member (e.g., a spring) returns the pressure plate to its initial position, resulting in disengagement of the clutch assembly.

Various clutch system sensors provide data regarding the clutch assembly and its operation. For example, pressure sensors 124 are known in the art and can be installed to measure pressure acting on one or more of the discs or plates of the clutch assembly. Rotational sensors 126, angular displacement sensors, and the like can be positioned to measure or enable calculation of the rotational speed (e.g., rpm) of, for example, the drive shaft, the driven shaft, or any of the rotating parts of the clutch assembly (e.g., splined hubs, splined shaft, plates, friction discs), etc. Pressure, rotational speed, temperature, acceleration, angular position, hydraulic pressure, and other sensors are known in the art and can likewise be used in the clutch control system to provide status, operational, feedback, and other data to the computer program 106. Such signals can directly or indirectly indicate whether the clutch is engaged, disengaged, partially engaged (and slipping), degree of slippage, etc., and directly or indirectly indicate the torque, force, horsepower, etc., various clutch elements are experiencing.

Mounted on or in the engine 116 are one or more engine sensors 120, which communicate engine sensor signals comprising measured or calculated engine parameters via the network 108 to the computer program 106. For example, sensors can be mounted to measure or detect parameters or calculate related data such as engine torque, horsepower, throttle position, temperature, exhaust flow, engine speed (rpm), etc. Such sensors and calculated data are known in the art as are the computers to receive, query, store, and calculate data, communicate with the sensors, interface with signal formats, etc.

Alternately or additionally, rather than the clutch control program 106 communicating directly with engine and clutch sensors, a separate computerized system or program, such as a remote start control program, can collect and transmit such sensor data, calculated data, operational status data, etc., to the control program 106 via network 108 or reside in computer 102 and memory 104 adjacent to program 106 and transmit the data without a network. For example, see the disclosure in International Patent Application, PCT/US14/17666, entitled Monotonic Coupling Assembly Engagement, filed Feb. 21, 2014, which is incorporated herein by reference for all purposes.

Since various sensors and computer programs operate on different, irregular, or variable background interrupt rates, reading rates, measuring intervals, etc., it is preferred that a time correlating to the parameter detection be associated with and recorded for each measured or calculated parameter. This allows use of the sensed and calculated data by the clutch control program 106 without the problems associated with identifying or using aged or unequally aged readings or data.

As explained above, the clutch assembly in certain applications is subject to severe torque spikes due to jams and other rapidly occurring overload events in the driven machinery and resulting in abrupt change in momentum of engine drive train. In such cases, it is desirable to disengage the engine from the driven machinery to avoid damage to the driving engine, the driven machinery, or coupling assembly.

For example, it is common for the clutch assembly to be installed on industrial wood chipping equipment. Such equipment utilizes a power source, such as a diesel engine, and clutch to transmit power to a high inertia cutter-head which in turn grinds trees or waste chips into wood chips and mulch. It is not uncommon for large pieces of tree or even foreign metal to come into contact with the cutter-head. This typically causes the cutter-head to come to an abrupt stop while the engine is still producing power. The clutch will normally slip momentarily to absorb such a shock load and then have enough torque to stall the engine since the cutter-head is locked up. When such a shock load occurs, it is desirable that the clutch controller disengage the clutch prior to the occurrence of engine stall or engine speed drop below a predetermined threshold. This requires prediction of a Rapid Onset Overload Event. Engine speed, clutch input speed, and clutch output, for example, drop during a Rapid Onset Overload Event and monitoring thereof can be used to predict occurrence of such an event. Active and automatic disengagement of the clutch will act to prevent engine stall and the engine will return to normal operating speed.

Engine stall can cause impact damage and damage engine turbo chargers and other components if the engine is not immediately restarted. By keeping the engine running such damage is prevented. Additionally, the clutch friction pack can cool to operating temperature faster than if the engine had stalled, allowing the operator to return to operations sooner. Further, in some equipment, such as a front-end loader, an engine stall requires the operator to climb down and restart the engine on the wood chipping or other driven machinery. Accordingly, with a prediction and prevention system in place, the operator simply decelerates the engine from operating speed to the normal clutch engagement speed, re-engages the clutch, and returns the engine to operating speed.

In some clutch assemblies, slippage is expected and tolerated. In such systems, the clutch pressure can be lowered, to a predetermined operating point, to allow clutch slippage, and thereby minimize transfer of engine momentum to the drivetrain in the event of a shock load. In such a case, where the program predicts an engine failure, the program automatically sends a control signal to the clutch assembly to disengage. Such an intermediary operating point allowing clutch slippage is unnecessary where the torque transmitting capability of the clutch is greater than the engine output torque and momentum. In such cases, slippage is merely incidental to the last moments of disengagement.

A Rapid Onset Overload (ROO) prediction and prevention program 106 is provided to actively and automatically disengage the clutch upon the occurrence of a preselected output value calculated by algorithms of the program based on measured or monitored operating parameters such as engine speed.

The program 106 receives or collects input data from the engine and clutch sensors or from other programs tracking such data. The program 106 utilizes the data in an iterative algorithm to predict occurrence of an engine stall or other failure likely to occur during a Rapid Onset Overload event (e.g., a shock load, jam, etc.). Alternately, the program can be keyed to anticipated clutch failure (e.g., torque overload), driven machine failure, or another limiting consideration of the machine.

If an overload failure is predicted, the program 106 sends control signals to the clutch controller 112 to disengage the clutch 114. If, during a Rapid Onset Overload event, the program does not predict imminent failure (that is, the program predicts recovery without intervention), the program does not intervene and the clutch remains engaged.

Figure 3:
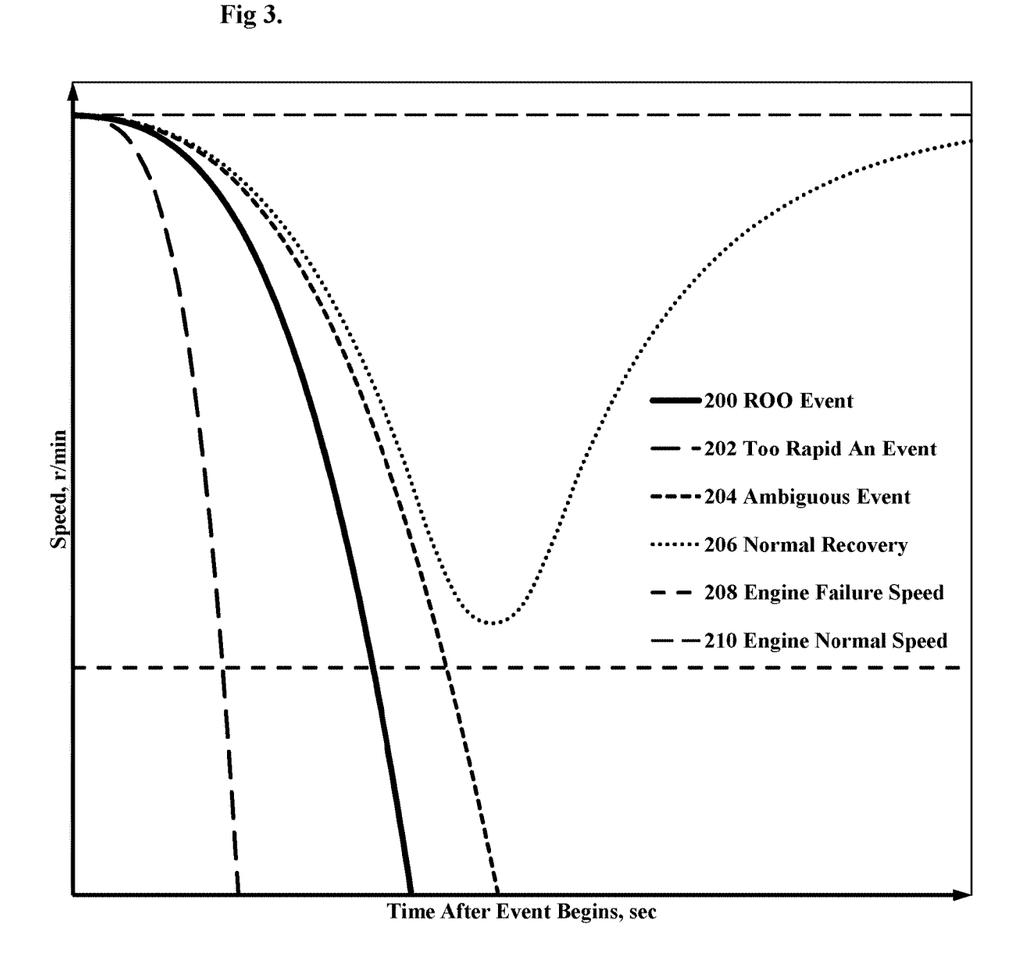
FIG. 3 is a representative graph of engine speed (rpm) versus time (seconds) after onset of a Rapid Onset Overload event for various conditions in accordance with aspects of the disclosure.

FIG. 3 is a representative graph of engine speed (rpm) versus time (seconds) after onset of a Rapid Onset Overload event for various conditions in accordance with aspects of the disclosure. The line 210 indicates normal engine operating speed.

The curve designated "ROO Event" 200 is of engine speed (rpm) versus time (seconds) after onset of a Rapid Onset Overload event and for an event which the Rapid Onset Overload protection program can detect and react prior to engine failure. The area between the ROO curve and the "Too Rapid an Event" curve 202 identifies a ROO event for which the program can disengage the clutch with adequate time for engine recovery. Such an event may be caused, for example, by a sizeable hard stump jamming a wood chipper or a moderate boulder jamming a rock crusher.

The area under the "Too Rapid an Event" curve 202 indicates a Rapid Onset Overload event which is so abrupt and severe that the ROO protection program cannot intervene in time to prevent engine failure 208. Such events require mechanical overload protection such as the clutch releases discussed above. Such an event may be caused, for example, by a railroad rail in a wood chipper.

The area between the curve designated "Ambiguous Event" 204 and the "ROO Event" curve 200 indicates an overload event which, if the program fails to intervene (i.e., disengage the clutch), may result in engine failure or, if the program intervenes (i.e., disengages the clutch) unnecessarily, may result in a "nuisance" disengagement since, absent the intervention, the engine would not fail.

The area above the "Ambiguous Event" curve 204 does not require clutch disengagement or intervention by the program since the load increase results in engine speed bogging but from which the engine recovers on its own. For example, see the curve designated "Normal Recovery" 206. The program will identify the event as a recoverable event during its occurrence and not intervene.

Figure 4:
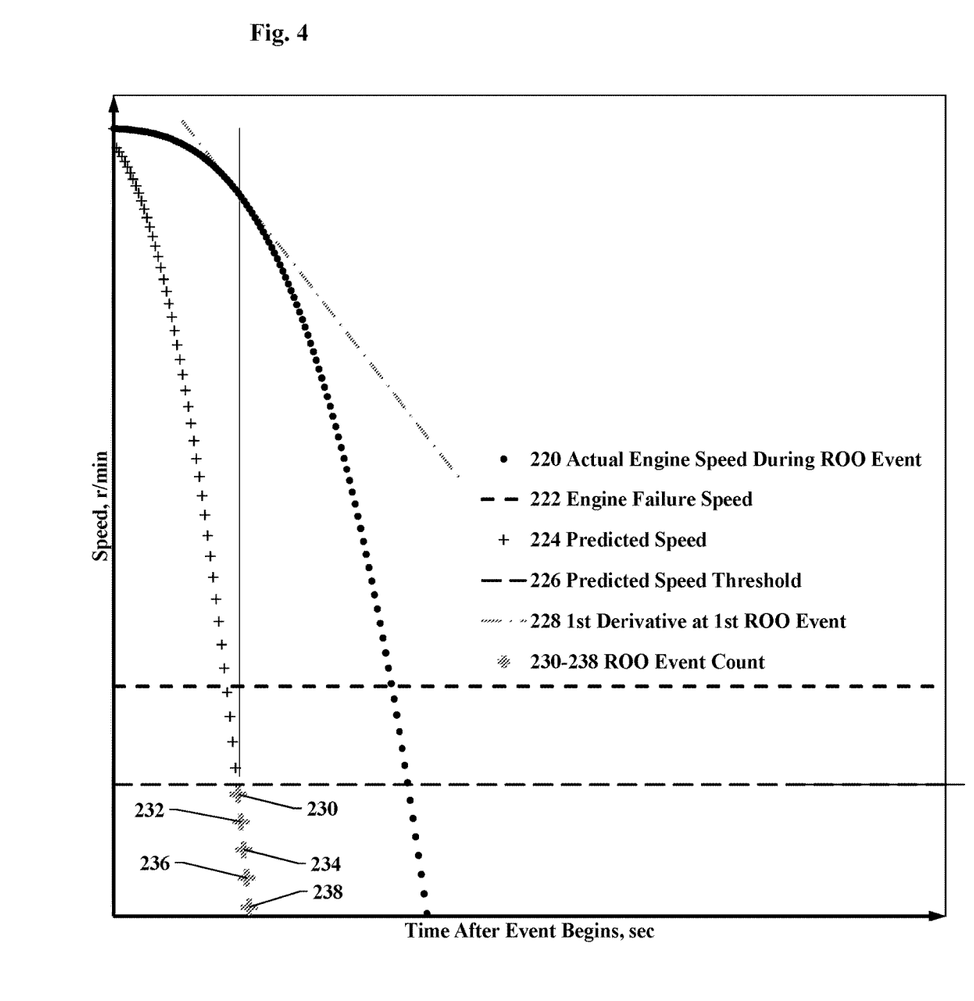
FIG. 4 is a representative graph of engine speed (rpm) versus time (seconds) after onset of a Rapid Onset Overload event and indicating predicted engine speed as computed by the protection program in accordance with aspects of the disclosure.

FIG. 4 is a representative graph of engine speed (rpm) versus time (seconds) after onset of a Rapid Onset Overload event and indicating predicted engine speed as computed by the protection program in accordance with aspects of the disclosure.

The dotted curve 220 indicates a series of actual, engine speed measurements (in rpm) during a ROO event. Time elapsed between speed measurements (at each dot) is on the order of 10 milliseconds (ms) using commercially available sensors and equipment. As expected, the engine speed drops rapidly over a short time period. Notably, the rate of change of speed increases over time as well. The engine failure speed is indicated as a heavy dashed line 222.

The cross-mark curve 224 is a plot of predicted engine speed as determined by the ROO protection program according to algorithms used by the program where each cross represents a predicted speed calculated or produced by the program. That is, the program 106 receives measurement or calculations of the actual speed of the engine, indicated as curve 220, at (preferably regular) time intervals, performs an iteration of its predictive behavior algorithm(s), and determines a predicted speed of the engine, as indicated by curve 224.

A predicted speed threshold 226 is a selected predicted speed value. If an iteration of the program outputs a predicted speed 230 below the threshold value, it indicates a prediction of future engine stall or failure. Upon occurrence of a predicted failure, the program sends a clutch control signal to disengage the clutch.

In an alternative embodiment, multiple "counts" of predicted speed values 230, 232, 234, 236, and 238 less than the predicted speed threshold 226 resulting from multiple, consecutive iterations of the program can be required for the program to disengage the clutch. This allows more time for the engine to recover or indicate potential recovery, prior to clutch disengagement. Further, requiring multiple or multiple consecutive predicted speed values below the threshold allows for normal variance in engine speed during operation without triggering a clutch disengagement.

The calculation of the predicted speed curve 224, in an embodiment, includes taking a first derivative of the actual engine speed curve 220 that is representative of engine speed (rpm) per unit time (sec) in that execution interval; that is, an indication of rate of engine speed change or acceleration (rpm/sec). The dash-dot curve 228 is the first derivative taken at the first ROO Event count 230, for example.

Figure 5:
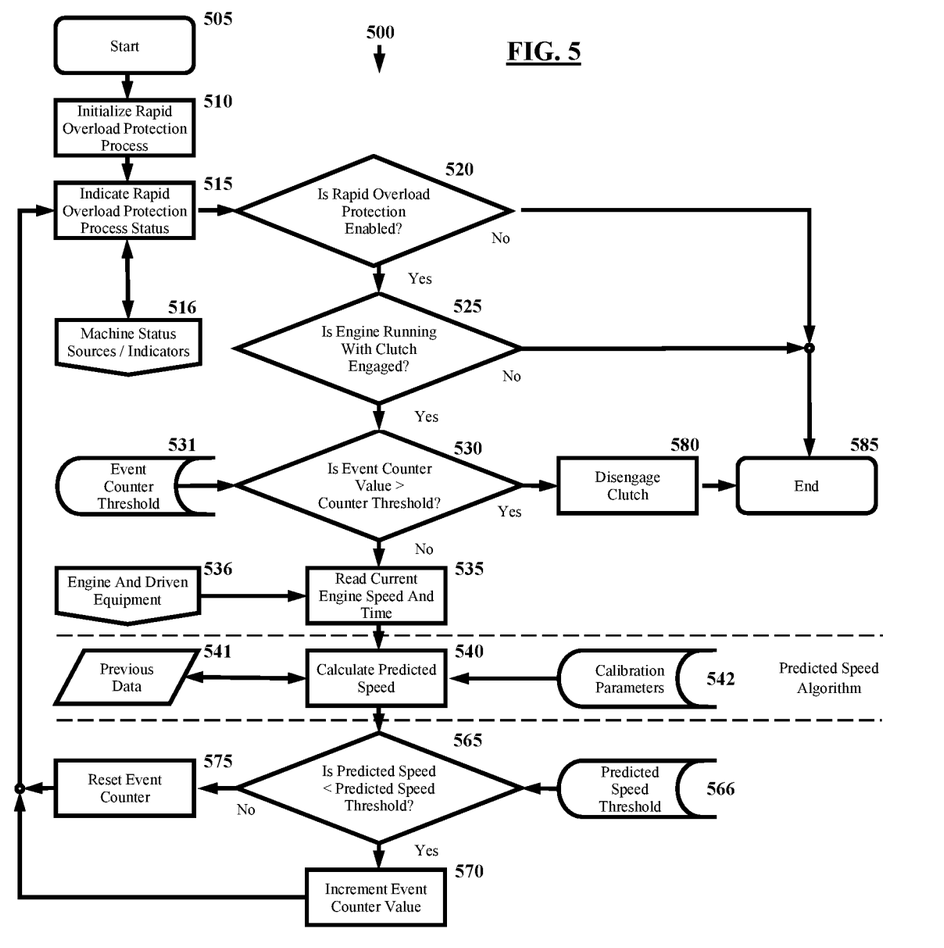
FIG. 5 is an exemplary flowchart of a computer implemented method according to aspects of the disclosure.

FIG. 5 is an exemplary flowchart of a computer implemented method according to aspects of the disclosure.

The exemplary method 500 begins at block 505, "Start." The ROO Protection program process is initiated at block 510. At block 515, the machine status is obtained and the most recent results from the program are indicated. For example, an indication of predicted engine overload, predicted non-overload of the engine, normal engine operation, a program error, etc. Preferably the status is output to and displayed on an operator interface.

Communications are transmitted between blocks 515 and 516. At block 516 input values and queries are communicated (sent and/or received) between one or more machine or engine status sources and the program. For example, data sources can be other software programs or computers providing input such as confirmation of engine, clutch, and/or machine status. For example, an engine status source at block 516 can be an independently operating software program for controlling remote start of the engine, and the status or other data input to the program at block 515 can include confirmation that the engine switch is in the on position, the engine is running (e.g., measuring at an rpm threshold), the clutch is engaged, etc., or some combination thereof.

Alternately or additionally, the program at block 515 can receive input from one or more sensors at block 516 directly. For example, the computer program can receive (pushed or pulled) sensor data from sensors positioned to measure and/or calculate engine and clutch parameters such as clutch pressure and engine speed (rpm) as discussed above herein. The inputs needed for the program will vary based on the engine, the clutch assembly, the driven machinery, sensor types and configuration, clutch type and configuration, and the particular algorithm run by the computer (e.g., where the algorithm utilizes selected combinations of selected engine data, clutch data, etc.).

Further, the system disclosed herein can work in conjunction with pre-existing or installed control programs and controllers for the engine or driven machinery. For example, upon determination of an impending failure, the program can communicate, at block 515, with the driven machinery controller, at block 516. The ROO program can communicate that clutch disengagement, by action of the ROO program, is imminent. The notice allows time for the driven machinery controller to transmit appropriate control signals commanding the driven machinery to take a particular action (such as to disengage or shut-down). Alternately, the driven machinery program can communicate a signal or command to the ROO program to override or disregard a predicted overload and leave the clutch engaged. Similar communications can be transmitted between the ROO program and engine controllers and programs. Such communications can be employed to prevent the programs from simultaneously overriding a disengagement or shut-down command resulting in failure due to the rapid onset overload.

At block 520, the program determines if ROO protection is enabled. If not, the program ends at block 585. Preferably a corresponding message is relayed to an operator interface.

At block 525 the program determines whether the machine, clutch, or engine status obtained at block 515 meets preselected conditions. If not, the program ends at block 585. If so, the program moves to block 530.

At block 530, the program compares a current Event Counter Value to an Event Counter Threshold Value of block 531. The Event Counter Threshold Value is a preselected and stored value which can be set and/or changed by the operator or programmer at block 531. The current Event Counter Value is accumulated, if indicated, at block 570, where a counted "event" is a calculation indicative of predicted engine failure.

The Event Counter Threshold Value can be "one" event but is preferably higher. For example and with reference to FIG. 4, if the program predicts an imminent engine failure based on recent engine measurements or behavior (e.g., a calculation below a predicted speed threshold), it is considered one "ROO Event" and the current Event Counter Value is incremented by one. Multiple iterations of the method of the program may indicate successive predicted ROO Events (e.g., points 230-238 at FIG. 4.

If the Event Counter Value reaches the Event Counter Threshold Value of block 531, the program disengages the clutch assembly at block 580 and the program ends at block 585.

More granularly, the program takes an action conditional on the comparison at block 530, such as sending one or more signals, via network 108, to the clutch controller 112 causing the clutch controller 112 to disengage the clutch assembly 114. Clutch disengagement for the exemplary clutch described is achieved by reducing hydraulic pressure through control line 122 and/or venting hydraulic pressure through a pressure vent. Reduction of hydraulic pressure may be achieved by disengaging or turning off a hydraulic pressure pump or the like. For other clutch and clutch controller types, the granular actions will be different, such as increasing hydraulic pressure (where the clutch is biased toward engagement), sending an electrical signal to an electro-mechanical actuator, etc., as is understood by those of skill in the art. Generally, this process is referred to herein by such phrases as "the program disengages the clutch," and the like, even though it is understood that interim granular steps and actions must occur.

Where the Event Counter Value is below the Event Counter Threshold Value, the method moves to running an algorithm to predict imminent engine behavior, especially imminent failure due to overload. At block 535 the current (or most recent) relevant data are identified and/or input, such as current engine speed and corresponding time. The current data is acquired at block 536 from corresponding engine, machine, or clutch sensors, or from independent software programs or computers which themselves acquire, store, calculate, and transmit such data.

The time parameter can be supplied by the sensors or independent software, by the computer program in conjunction with a clock mechanism or function, etc. Because the interrupt rate, timing intervals, measurement intervals, etc., often vary across equipment and over time in a selected piece of equipment, it is preferable to record a time (of day or since start-up, etc.) of acquisition associated with the sensor data, rather than a number of incremental time intervals.

The current data can be considered a single point plotted on, for example, the Actual Engine Speed curve 220 on the graph in FIG. 4. Subsequent data provides subsequent points, resulting in the exemplary curve 220.

At block 540, a predicted engine speed (or other selected value) is calculated. Such calculations require input of previous data values which can be stored at block 541 after acquisition at block 536, for example. The calculation of predicted engine speed (or other selected value) is performed through one or more prediction algorithms. It is anticipated that additional data or selected information is needed for the operation of these algorithms, such as calibration parameters at block 542.

At block 565 the predicted speed value is compared to a threshold predicted speed value. If the predicted speed remains above the threshold value provided by block 566, then the Event Counter is reset to zero and no imminent engine failure is predicted. An alternative realization is to reduce the Event Counter value by "one", limiting its value to no less than "zero." If the predicted speed value is below the threshold, the Event Counter Value at block 570 is incremented by one. In either case, the program returns to the beginning (or early) blocks and is repeated.

The iterative calculation of predicted speed based on current and recent system parameters and data, such as from sensors or intervening programs and computers, provides an on-going predictive analysis of imminent engine failure. Speed of parameter measurement, data transmission, data manipulation, iterative program operation, prediction of an event, and then transmission of control signals to the clutch controller and clutch actuators are critical, as the time elapsed between occurrence of engine parameters indicative of failure and the failure itself is measured in small fractions of a second. For example, engine and clutch parameter measurements or calculation (e.g., engine speed, clutch pressure, etc.) can occur on the order of every 10 ms or so. The program iterations run at a comparable speed (at least), providing control signals to the clutch controller as necessary in a short enough period to allow clutch disengagement prior to the anticipated engine stall.

Computational efficiency is important to minimize demands on the computer 102 of the controller because the algorithm must execute very rapidly (e.g., every few milliseconds, every ten milliseconds or so, or every twenty milliseconds or so). The algorithm disclosed is computationally efficient, though other methods may be used with equivalent results. An acceptable algorithm is as follows:

$$PredictedSpeed = CurrentSpeed + \sum_{n=1}^{m} ScaleFactor_n f^{(n)}(CurrentSpeed, CurrentTime)$$

where "m" is the highest order derivative of the algorithm. Where "m"=1 for calculation with only a first order derivative, the algorithm is also known as the backwards Euler method.

Figure 5A:
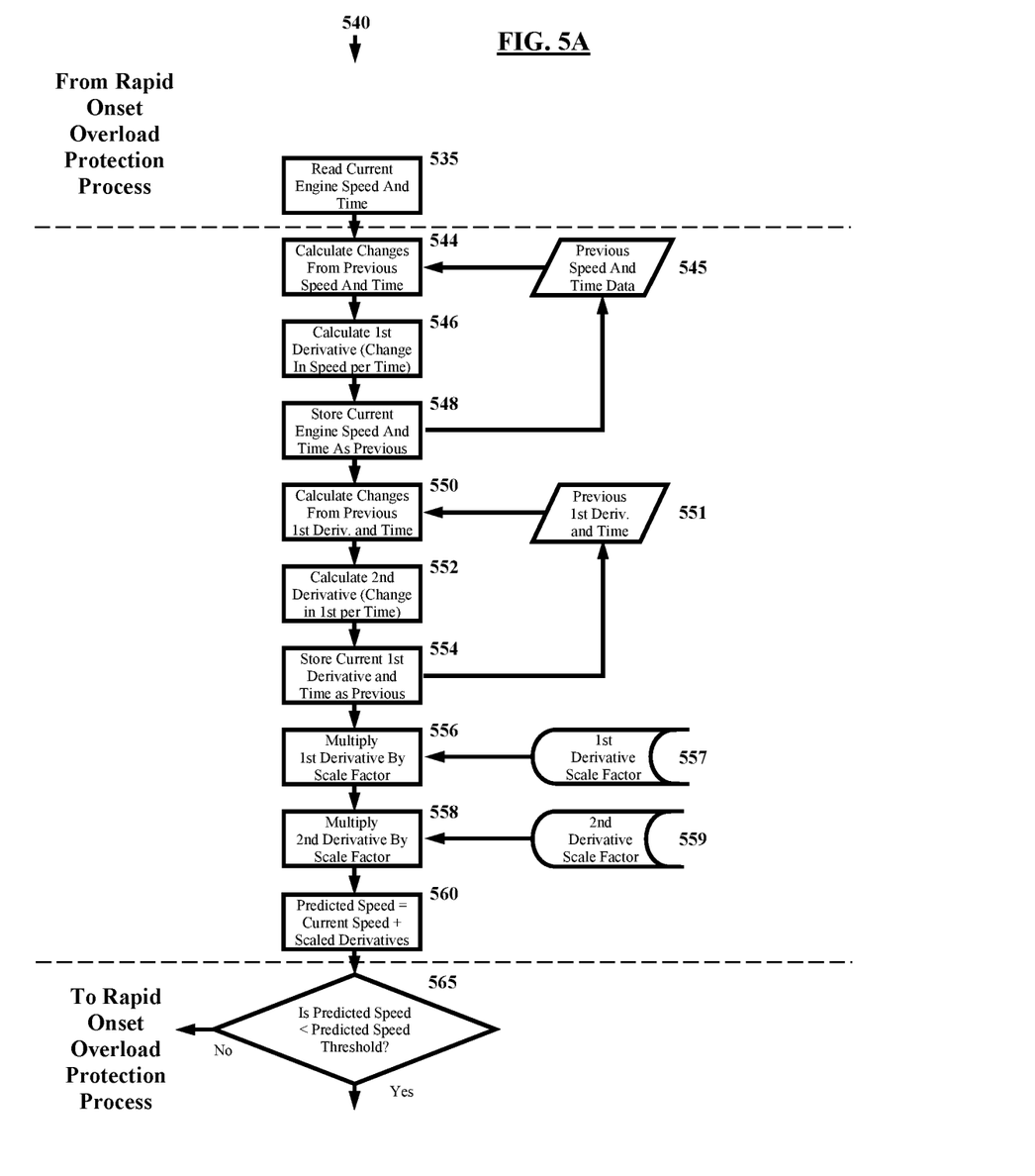
FIG. 5A is an exemplary flowchart of a computer implemented sub-routine according to aspects of the disclosure for use in the flowchart of FIG. 5.

It is worth noting that, in rigorous mathematics, a true derivative is obtained as δt→0, where δt is the difference between the Current Time and the Previous Time, as computed approximately in FIG. 5A blocks 546 and 552.

As discussed above, the program 106 utilizes measured or calculated data in an iterative algorithm to predict occurrence of an engine stall or other system failure likely to occur during a Rapid Onset Overload event. The program can be keyed to predicted engine stall or failure, clutch failure (e.g., torque overload), driven machine failure, or another limiting consideration of the machine. The necessary input data will vary depending on the selected limiting consideration.

For example, in the exemplary flowcharts and accompanying explanation, the analysis is to predict imminent engine stall, as indicated by a drop in engine speed. Determination of predicted engine stall uses actual engine speed (current and past), predicted engine speed (rpm), some predicted algorithm value (whether in speed directly or derivatives or other manipulations thereof), and/or comparisons to selected and preferably tested variables or calibration parameters.

Alternately, the analysis and algorithms can be keyed to, for example, engine torque failure, in which case, the measured parameters can be shaft angular displacement, clutch or engine torque, stress, strain, etc. The algorithm would calculate torque, change in torque, rate of change of torque, or other values (dimensioned or dimensionless) to predict engine torque failure. Other measurable or calculable parameters potentially indicative of an imminent failure include engine or machinery horsepower, machinery resistance, load resistance, torque, torque differential, stress and strain measurements, angular displacement, electrical load, resistance or current, etc.

FIG. 5A is an exemplary flowchart of a computer implemented method or sub-routine according to aspects of the disclosure. FIG. 5A presents a flowchart for calculating predicted speed (or other selected value) from block 540 of FIG. 5 and provides an exemplary process occurring between the dotted lines indicated on that figure. Block 535 is repeated for orientation. Blocks 545 and 551 provide more explicit detail of FIG. 5 block 541, as do blocks 557 and 559 of FIG. 5 block 542.

At block 544, changes from previous speed and time or other measured or calculated parameters are calculated. For example, the change between current data obtained at block 535 and corresponding previous data, such as stored at block 545, is calculated. For example, the engine speed may have changed by −2 rpm (e.g., from 2450 to 2448 rpm, the speed reduction indicated by negative value.) Time elapsed is calculated (e.g., 10 ms).

At block 546 a first derivative is calculated using the results of block 544. The change in (delta) speed over change in (delta) time yields a rate of change in speed (e.g., rpm/sec). Using the same example, the first derivative is −200 rpm/sec. This defines a slope on the curve 220 of FIG. 4. The first derivative value is used as a basis for predicting future engine behavior in an embodiment.

At block 548 the current data (engine speed, time) is stored, displacing previous data at block 545. Of course the data sets can be stored for longer terms, but here the program designates the most-recent data for use in the next iteration of the algorithm or method.

At block 550 any change is calculated between the current first derivative value (calculated at block 546) and a previous first derivative value, stored at block 551. For example, the first derivative value may have changed from a previous value of −199 rpm/sec to the −200 rpm/sec value of the current calculation. (Reduction in first derivative value yields a negative value.) Time elapsed is used as well.

At block 552 a second derivative is calculated using the results of block 550. The change in (delta) first derivative value over change in (delta) time yields a rate of change in first derivative (e.g., rpm/sec$\wedge$2). Using the same example, the second derivative is −100 rpm/sec$\wedge$2. This defines a rate of change of the slope on the curve 220 (not shown). The second derivative value, alone or in combination with the first derivative value, can be used as a basis for predicting engine speed or behavior.

At block 554, the current first derivative value and time are stored, displacing the previous values at block 551. Of course the data sets can be stored for longer terms and/or non-consecutive data sets can be compared or used as inputs, but here the program designates the most-recent data for use in the next step or iteration of the algorithm.

At block 556 the first derivative value is multiplied by a first derivative scale factor, of units "seconds," stored at and input from block 557. The scale factor is a variable selected by the operator or programmer and operates to increase the sensitivity of the first derivative value. The higher the scale factor, the greater the sensitivity. In the example given, the first derivative value (slope of −200 rpm/sec at a point on the actual engine speed curve 220) is multiplied by a scale factor of 10 seconds to yield a scaled first derivative value of −2000 rpm. The same calculation using a scale factor of 15 seconds yields a relatively steeper slope and scaled first derivative value of −3000 rpm.

At block 558 the second derivative value is multiplied by a second derivative scale factor, of units "seconds$\wedge$2", input from block 559. The scale factor is a variable selected by the operator or programmer and operates to increase the sensitivity of the second derivative value. The higher the scale factor, the greater the sensitivity. In the example, the second derivative value is multiplied by a scale factor of 0 sec$\wedge$2 to yield a 0 rpm, to demonstrate disabling this term of the polynomial expansion, as might be done with a very erratic engine speed signal. The same calculation using a scale factor of 2 sec/\2 yields a relatively lower −200 rpm.

Although FIG. 5A demonstrates the method with "m=2," it is apparent that "m" may be greater and that higher order derivatives can be employed with replicates of blocks 544 through 548 and blocks 556 through 557.

At block 560, the scaled derivative values are added to the current speed data. (Note that the scaled first derivative value is a negative value when the engine speed is decreasing, though the values of the second and higher-order scaled derivatives may be either negative or positive.) In the example, the scaled first derivative value of −2000 rpm and the scaled second derivative value of 0 rpm are added to the current speed 2448 rpm yielding a Predicted Engine Speed value of 448 rpm.

The Predicted Speed Threshold is an arbitrary numerical value which, in conjunction with the scale factors and other variables, gives the desired sensitivity to a Rapid Onset Overload. In the example, the Predicted Speed Threshold Value is 500 rpm from FIG. 5 at block 566.

Comparison of the Predicted Speed to the Predicted Speed Threshold is performed at block 565, as also seen in FIG. 5. In the example, the Predicted Engine Speed Value of 448 rpm is less than a Predicted Speed Threshold Value of 500 rpm and the Event Counter Value is incremented in block 570.

Subsequent iterations of the method use the Event Counter value, as changed at either block 570 or block 575 during the prior iteration. Assuming the Predicted Speed continues to be less than the Predicted Speed Threshold, eventually the Event Counter Value will exceed the Event Counter Threshold at block 530, and the program will disengage the clutch.

Note that Predicted Speed is a computed value, not necessarily the actual speed of the engine, and is not to be compared with the engine speed for determining its accuracy. The Predicted Speed Threshold, therefore, is typically not the same value as the actual engine speed threshold at which the engine fails.

The graphs at FIGS. 3-4 represent the Engine Speed profiles as smooth and continuous. Actual speed signals are noisy, with rapid increases and decreases due to variations in loading and from reactions of the engine controls. For a Rapid Onset Overload Event to be detected, the Predicted Speed must be "far enough" below the Predicted Speed Threshold that noise in the Engine Speed signal does not give a Predicted Speed above the Predicted Speed Threshold and reset the Event Counter before its threshold count is reached.

Consequently, where the system utilizes selected variables or parameters, the selection can be adjusted to account for the particular driven machinery and the preferences of the operator. Adjustment of the variables will result in greater or lesser sensitivity; that is, selection of the variables will determine how easily (and how often) the system disengages the clutch assembly. A higher sensitivity results in clutch disengagement more often and/or under less strenuous loading; a lower sensitivity results in less frequent clutch disengagement and/or disengagement under relatively more strenuous loading. Determining the variable values to suit the operator, the machinery in use, typical local operating conditions, etc., is time consuming and prone to error.

Consequently, in an embodiment, the system is provided with a method for adjusting the sensitivity of the automated clutch disengagement. It is envisioned that the sensitivity of the ROO detection method can be operator-controlled. Control can be by physical adjustment of a knob, dial, slidable bar, rheostat, potentiometer, etc., as is known in the art, or by operator input to an interface, such as by virtual scroll bar, buttons, dial, numeric entry, or other selectable adjustment interface as is known in the art.

For example, an Overload Setting (or Sensitivity Setting or the like) can be provided for operation by the operator (e.g., on a numeric scale, minimum-maximum scale, etc.). Such an Overload Setting provides for selection or variation of a value or algorithm which affects the protection process sensitivity by changing Derivative Scale Factors, Predicted Speed Threshold, and/or Event Counter Threshold values. The Overload Setting 132 can provide for selection from a physical or virtual dial, up/down or +/− buttons, a sliding scale or scroll bar, from a table, drop-down menu, or pop-up box, etc. A lower Overload Setting causes clutch disengagement at maximum sensitivity. Protection is almost or completely disabled at a high Overload Setting or minimum sensitivity. The Overload Setting is seen in FIG. 2 as physically located on the clutch assembly controller 112. Obviously, the Overload Setting can alternately be positioned as part of the functioning of the computer program 106 and visible to the operator on interface 110.

Decreasing the Derivative Scale Factor and Predicted Speed Threshold results in a method which requires a greater rate of speed change before the Predicted Speed is below the Predicted Speed Threshold and an Event is counted. Derivative Scale Factors can be adjusted for first, second, and higher order derivatives. Increasing the Event Counter Threshold results in a method which requires more consecutive ROO Events before clutch disengagement. Changing the algorithm used to calculate or determine the Predicted Speed, etc., can alter the sensitivity in either direction. The operator or manufacturer can change such variables directly, but preferably the operator is provided with a simpler mechanism for altering the system's sensitivity.

Consequently, in an embodiment, sensitivity adjustments made to suit conditions and operator preferences, and the resulting machine performance, are monitored and logged. It is envisioned that correlations observed by human analysis and/or algorithm ("machine learning") are used to change both the variable selection algorithm or table and the default settings of the variables.

It is anticipated that existing controls act to protect the engine and machinery, for example by disconnecting the clutch if the engine bogs slowly over a period of time. If such protection is incorporated into the disclosed ROO protection method, such additional protections do not affect the applicability of this invention.

The following is provided in support of any methods, steps, or actions claimed or which may be later claimed. Specifically, this explanation is provided to meet the technical, procedural, and substantive requirements of certain examining offices. It is expressly understood and disclosed and thereby supported that the steps or actions of claimed methods can be performed in any order, unless specified or otherwise necessary, that each portion of the method can be repeated, performed in orders other than those presented, that additional actions can be performed between the enumerated actions, and that, unless stated otherwise, actions can be omitted without affecting other such actions. Those of skill in the art recognize as obvious that various possible practicable combinations of actions utilized in the methods disclosed herein are supported without an explicit listing of every possible such combination or permutation. It is explicitly disclosed that the actions disclosed, both in the claims and elsewhere herein, can be performed in any order (xyz, xzy, yxz, yzx, etc.). It is explicitly asserted that the claims as-filed are part of the disclosure and may themselves support and provide basis for claimed subject matter.

Disclosed are methods for selectively disengaging a clutch assembly interposed between an engine and driven machinery to prevent a rapid onset overload event, the methods comprising combinations of the following steps, additional steps disclosed herein, in any order as per claim 25 and following. Receiving at a computer program operable on a computer having a non-transitory memory successive sensor signals indicative of current operating parameters of the engine, driven machinery, or clutch assembly; assessing the successive sensor signals and corresponding signal times and at least a first or higher order derivative thereof; determining, in response to the assessment, a potential imminent engine failure; and transmitting a disengagement signal to a clutch actuation assembly for selectively disengaging the clutch assembly.

26. The method of claim 25, further comprising applying individual scale factors to the rates of change of the differences between successive sensor signals. 27. The method of claim 25, further comprising comparing the sum of a current sensor signal and multiple scaled rates of change of differences between the successive sensor signals against a preselected threshold value. 28. The method of claim 25, wherein the sensor signals communicate a physical parameter of at least one of the group consisting of: engine speed, driven machinery speed, clutch input shaft speed, clutch output shaft speed, relative rotational speeds, and torque. 29. The method of claim 25, further comprising adjusting the sensitivity of determining the imminent engine failure in response to receiving a signal corresponding to an operator-controlled adjustment. 30. The method of claim 29, further comprising adjusting the sensitivity by altering at least one of a first-order or higher Derivative Scale Factor, a Predicted Speed Threshold, or an Event Counter Threshold. 31. The method of claim 25, further comprising comparing the sum of a current sensor signal and scaled first order or higher derivatives of the successive sensor signals over time against a preselected threshold value having a known relationship to engine failure.

Definitions

The system, methods, and other embodiments according to the present disclosure include computerized systems requiring the performance of one or more methods or steps performed on or in association with one or more computer.

A computer is a programmable machine having two principal characteristics, namely, it responds to a set of instructions in a well-defined manner and can execute a pre-recorded list of instructions (e.g., program). A computer according to the present disclosure is a device with a processor and a memory. For purposes of this disclosure, a computer includes a dedicated real-time controller, a server, a personal computer, (i.e., desktop computer, laptop computer, netbook), a mobile communications device, such as a mobile "smart" phone, and devices providing functionality through internal components or connection to an external computer, server, or global communications network (such as the internet) to take direction from or engage in processes which are then delivered to other system components.

Those of skill in the art recognize that other devices, alone or in conjunction with an architecture associated with a system, can provide a computerized environment for carrying out the methods disclosed herein. At least some of the method aspects of the disclosure are computer-implemented and, more particularly, at least one step is carried out using a computer.

General-purpose computers include hardware components. A memory or memory device enables a computer to store data and programs. Common storage devices include disk drives, tape drives, thumb drives, and others known in the art. An input device can be a keyboard, mouse, a touchscreen, and other input devices known in the art. The input device is the conduit through which data and instructions enter a computer. An output device is a display screen, printer, or other device letting the user sense what the computer has accomplished, is accomplishing or is expected to accomplish. A central processing unit (CPU) is the "brains" of the computer and executes instructions and performs calculations. For example, typical components of a CPU are an arithmetic logic unit (ALU), which performs arithmetic and logical operations and a control unit (CU) which extracts instructions from memory, decodes and executes them, calling on the ALU when necessary. The CPU can be a micro-processor, processor, one or more printed circuit boards (PCBs). In addition to these components, others make it possible for computer components to work together or in conjunction with external devices and systems, for example, a bus to transmit data within the computer, ports for connectivity to external devices or data transmission systems (such as the internet), wireless transmitters, read and read-write devices, etc., such as are known in the art.

A server is a computer or device on a network that manages network resources. There are many different types of servers, including remote, live and network access servers, data servers, member servers, staging servers, etc. A server can be hardware and/or software that manages access to a centralized resource or service in a network. For purposes of this disclosure, the term "server" also includes "virtual servers" which can be hosted on actual servers.

A computer network or data network is a communications network allowing computers to exchange data, with networked devices passing data to each other on data connections. Network devices that originate, route, and terminate data are called nodes. The connections (links) between nodes are established using wire or wireless media. Nodes can include hosts, such as PCs, phones, servers, and networking hardware. Devices are networked together when one device is able to exchange information with the other device whether or not they have a direct connection to each other. Computer networks support applications such as access to the World Wide Web (www) or internet, shared use of application and storage servers, printers, and use of email and instant messaging applications. Computer networks differ in the physical media to transmit signals, protocols to organize network traffic, network size, topology, and organizational intent.

A (control) gateway is a network node that acts as an entrance to another network. In homes, the gateway is the ISP (internet service provider) that connects the user to the internet. In enterprises, the gateway node often acts as proxy server and firewall. The gateway is also associated with a router, which uses headers and forwarding tables to determine where packets are sent, and a switch, which provides the actual path for the packet in and out of the gateway.

A (control) gateway for the particular purpose of connection to identified cloud storage, often called a cloud storage gateway, is a hardware-based and/or software-based appliance located on the customer premises that serves as a bridge between local applications and remote cloud-based storage and are sometimes called cloud storage appliances or controllers. A cloud storage gateway provides protocol translation and connectivity to allow incompatible technologies to communicate transparently. The gateway can make cloud storage appear to be an NAS (network attached storage) filer, a block storage array, a backup target, a server, or an extension of the application itself. Local storage can be used as a cache for improved performance. Cloud gateway product features include encryption technology to safeguard data, compression, and deduplication, WAN optimization for faster performance, snapshots, version control, and data protection.

A "bridge" connects two (local) networks, often connecting a local network using an internet router.

A CAN (Controller Area Network) Bus is a digital serial bus designed for industrial environments and is used in myriad applications including in the disclosed technology field. A CAN bus replaces wiring harnesses with a two-wire differential cable carrying inverted voltages to decrease interference. One or more CAN busses can be utilized in the exemplary network of the disclosure.

CAN provides services at layers 1 and 2 of the OSI model and uses a broadcast method for placing frames on the wire somewhat similar to Ethernet. Bus distance is based on speed, ranging approximately from a maximum of 40 meters at 1 Mbps to a maximum of six kilometers at 10 Kbps. At speeds up to 125 Kbps, CAN provides fault tolerance. If one of the two wires is cut or shorted, the other keeps transmitting. Both low-speed and high-speed CAN buses are available commercially.

A router forwards data packets along networks and is connected to at least two networks, commonly LANs, WANs, or a LAN and its ISP network. Routers are located at "gateways," the places where two or more networks connect. Routers use headers and forwarding tables to determine paths for forwarding packets and use protocols to communicate with each other to configure a route between hosts.

The disclosure includes one or more databases for storing information relating to aspects of the disclosure. The information stored on a database can, for example, be related to a private subscriber, a content provider, a host, a security provider, etc. One of ordinary skill in the art appreciates that "a database" can be a plurality of databases, each of which can be linked to one another, accessible by a user via a user interface, stored on a computer-readable medium or a memory of a computer (e.g., PC, server, etc.), and accessed by users via global communications networks (e.g., the internet) which may be linked using satellites, wired technologies, or wireless technologies.

Accordingly, a system, computer program, and computer-implemented method are provided for enabling Rapid Onset Overload protection. When the program indicates imminent engine failure, the program initiates a signal to disengage the clutch assembly thus preventing engine failure due to an actual overload.

The systems, computer-implemented methods, and computer program products in the embodiments described above are exemplary. Therefore, many details are neither shown nor described. Even though numerous characteristics of the embodiments of the present disclosure have been set forth in the foregoing description, together with details of the structure and function of the present disclosure, the present disclosure is illustrative, such that changes may be made in the detail, especially in matters of shape, size and arrangement of the components within the principles of the present disclosure to the full extent indicated by the broad general meaning of the terms used in the attached claims. The description and drawings of the specific examples above do not point out what an infringement of this patent would be, but are to provide at least one explanation of how to make and use the present disclosure. The limits of the embodiments of the present disclosure and the bounds of the patent protection are measured by and defined in the following claims.

The invention claimed is:

1. A clutch assembly and clutch control system for conditional disengagement of a clutch assembly interposed between an engine and driven machinery to prevent a rapid onset overload event, comprising:
    a clutch assembly interposed between an engine and driven machinery, the clutch assembly movable between engaged and disengaged positions;
    a sensor operatively connected to the engine, driven machinery, or clutch assembly for monitoring a system physical parameter and communicating sensor signals corresponding thereto;
    a clutch actuation assembly operably connected to selectively disengage the clutch assembly in response to a corresponding clutch control signal;
    a clutch controller interconnected between the sensor and clutch actuation assembly, the clutch controller receiving sensor signals and communicating clutch disengagement signals; and
    wherein the clutch controller determines a potential engine failure due to a rapid onset overload of the driven machinery from an assessment of multiple, successive sensor signals and corresponding times during which a sum of a current sensor signal and a scaled rate of change between successive sensor signals is compared to a predefined threshold value; and
    the clutch controller sends a clutch disengagement signal to the clutch assembly to disengage the clutch assembly in response to the determination of potential engine failure and prior to actual engine failure due to the rapid overload event.

2. The clutch assembly and clutch control system of claim 1, wherein the clutch controller further calculates a rate of change of a rate of change of the signal values.

3. The clutch assembly and clutch control system of claim 1, wherein the clutch controller further calculates higher order derivatives of the sensor signals.

4. The clutch assembly and clutch control system of claim 1, wherein the clutch controller further applies individual scale factors to rates of change of the differences between successive sensor signals.

5. The clutch assembly and clutch control system of claim 1, wherein the clutch controller further compares the sum of the current sensor signal and multiple scaled rates of change of differences between successive sensor signals and between successive rates of change of those differences against a preselected value having a known relationship to engine failure.

6. The clutch assembly and clutch control system of claim 1, wherein the clutch assembly is a dry friction clutch, wet friction clutch, slip clutch, cone clutch, centrifugal clutch, hydraulic clutch, electromechanical clutch, or electromagnetic clutch.

7. The clutch assembly and clutch control system of claim 1, wherein the clutch controller is a computer having a non-transient memory and capable of running a computer program.

8. The clutch assembly and clutch control system of claim 1, wherein the clutch controller is operably connected to a network and communicates with additional computers and controllers.

9. The clutch assembly and clutch control system of claim 1, wherein the clutch disengagement signal is a signal to increase or decrease hydraulic pressure to a clutch actuator.

10. The clutch assembly and clutch control system of claim 9, wherein the clutch actuator is a piston and cylinder assembly.

11. The clutch assembly and clutch control system of claim 1, wherein the system physical parameter is at least one of the group comprising the following: engine speed, driven machinery speed, clutch input shaft speed, clutch output shaft speed, relative rotational speeds, and torque.

12. The clutch assembly and clutch control system of claim 1, wherein communicating sensor signals and clutch disengagement signals includes transmission across a computerized network.

13. The clutch assembly and clutch control system of claim 1, further comprising an operator-controlled means for adjusting the sensitivity of the determination of a potential engine failure due to a rapid onset overload of the driven machinery.

14. The clutch assembly and clutch control system of claim 13, wherein the means for adjusting the sensitivity comprises a physical knob, dial, rheostat, or potentiometer.

15. The clutch assembly and clutch control system of claim 13, wherein the means for adjusting the sensitivity comprises a virtual knob, dial, slide bar, buttons, text box, or selection menu.

16. The clutch assembly and clutch control system of claim 13, wherein the means for adjusting the sensitivity provides adjustability for at least one of a first-order or higher Derivative Scale Factor, a Predicted Speed Threshold, or an Event Counter Threshold.

17. The clutch assembly and clutch control system of claim 1, wherein the clutch controller is operably connected to communicate with a driven machinery controller to transmit or receive an imminent disengagement signal or an override signal.

18. A clutch assembly and clutch control system for conditional disengagement of a clutch assembly interposed between an engine and driven machinery to prevent a rapid onset overload event, comprising:
a clutch assembly interposed between an engine and driven machinery, the clutch assembly movable between engaged and disengaged positions;
a sensor operatively connected to the engine, driven machinery, or clutch assembly for monitoring a system physical parameter and communicating sensor signals corresponding thereto;
a clutch actuation assembly operably connected to selectively disengage the clutch assembly in response to a corresponding clutch control signal;
a clutch controller interconnected between the sensor and clutch actuation assembly, the clutch controller receiving sensor signals and communicating clutch disengagement signals;
the clutch controller disengages the clutch assembly in response to a determination of potential engine failure and prior to actual engine failure due to the rapid overload event, the determination in response to assessment of successive sensor signal values and corresponding time values and at least a first or higher order derivative thereof.

19. The clutch assembly and clutch control system of claim 18, the clutch controller including a computer, memory, and computer program for making the determination.

20. The clutch assembly and clutch control system of claim 18, wherein the determination is made in response to calculations according to the formula:

$$PredictedSpeed = CurrentSpeed + \sum_{n=1}^{m} ScaleFactor_n f^{(n)}(CurrentSpeed, CurrentTime).$$

21. The clutch assembly and clutch control system of claim 18, wherein the determination is further in response to a scale factor applied to the first or higher order derivatives.

22. The clutch assembly and clutch control system of claim 21, wherein the determination is further in response to a comparison of scaled derivative values to a preselected threshold value.

23. A clutch assembly and clutch control system for conditional disengagement of a clutch assembly interposed between an engine and driven machinery to prevent a rapid onset overload event, comprising:
a clutch assembly interposed between an engine and driven machinery, the clutch assembly movable between engaged and disengaged positions;
a sensor operatively connected to the engine, driven machinery, or clutch assembly for monitoring a system physical parameter and communicating sensor signals corresponding thereto;
a clutch actuation assembly operably connected to selectively disengage the clutch assembly in response to a corresponding clutch control signal;
a clutch controller interconnected between the sensor and clutch actuation assembly, the clutch controller receiving sensor signals and communicating clutch disengagement signals;
the clutch controller disengages the clutch assembly in response to a determination of potential engine failure, and prior to actual engine failure, due to the rapid overload event, the determination in response to assessment of successive sensor signal values, the rate of change of the signal values, and the rate of change of the rate of change of the signal values, and so forth.

24. A method for selectively disengaging a clutch assembly interposed between an engine and driven machinery to prevent a rapid onset overload event, the method comprising:
receiving, at a computer program operable on a computer having a non-transitory memory, successive sensor signals indicative of current operating parameters of the engine, driven machinery, or cluth assembly;
assessing the successive sensor signals and corresponding signal times and at least a first or higher order derivative thereof;
determining, in response to the assessment, a potential imminent engine failure;
transmitting a disengagement signal to a clutch actuation assembly for selectively disengaging the clutch assembly.

25. The method of claim 24, further comprising applying individual scale factors to rates of change of differences between successive sensor signals.

26. The method of claim 24, further comprising comparing the sum of a current sensor signal and multiple scaled rates of change of differences between the successive sensor signals against a preselected threshold value.

27. The method of claim 24, wherein the sensor signals communicate a physical parameter of at least one of the group consisting of: engine speed, driven machinery speed, clutch input shaft speed, clutch output shaft speed, relative rotational speeds, and torque.

28. The method of claim 24, further comprising adjusting a sensitivity of determining the imminent engine failure in response to receiving a signal corresponding to an operator-controlled adjustment.

29. The method of claim 28, further comprising adjusting the sensitivity by altering at least one of a first-order or higher Derivative Scale Factor, a Predicted Speed Threshold, or an Event Counter Threshold.

30. The method of claim 24, further comprising comparing the sum of a current sensor signal and scaled first order or higher derivatives of the successive sensor signals over time against a preselected threshold value having a known relationship to engine failure.

\* \* \* \* \*